United States Patent
Boettcher et al.

(10) Patent No.: US 8,214,605 B2
(45) Date of Patent: Jul. 3, 2012

(54) METHOD FOR READING OUT DATA FROM A STORAGE MEDIUM

(75) Inventors: Joern Boettcher, Abstatt (DE); Dirk Herrmann, Moeglingen (DE); Jens Liebehenschel, Liederbach (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 12/305,597

(22) PCT Filed: Dec. 12, 2007

(86) PCT No.: PCT/EP2007/063780
§ 371 (c)(1), (2), (4) Date: Nov. 23, 2009

(87) PCT Pub. No.: WO2008/071733
PCT Pub. Date: Jun. 19, 2008

(65) Prior Publication Data
US 2010/0064110 A1    Mar. 11, 2010

(30) Foreign Application Priority Data
Dec. 14, 2006 (DE) .................. 10 2006 059 626

(51) Int. Cl.
*G06F 12/00* (2006.01)
(52) U.S. Cl. ...................................................... 711/154
(58) Field of Classification Search .................. None
See application file for complete search history.

(56) References Cited

U.S. PATENT DOCUMENTS

| 5,563,828 A | 10/1996 | Hasbun et al. |
| 7,752,381 B2 * | 7/2010 | Wong ............................ 711/103 |
| 2006/0168392 A1 | 7/2006 | Hwang |

FOREIGN PATENT DOCUMENTS

GB   2200228   7/1988

OTHER PUBLICATIONS

International Search Report, PCT International Patent Application No. PCT/EP2007/063780, dated May 8, 2008.
Jae Woo Chang et al: "Performance Comparison of Signature-Based Multikey Access Methods" Microprocessing and Microprograming, Elsevier Science Publishers, B.V., Amsterdam, NL, vol. 35, No. 1/5, Sep. 1, 1992, pp. 345-352 XP000325142.

* cited by examiner

*Primary Examiner* — Hiep Nguyen
(74) *Attorney, Agent, or Firm* — Kenyon & Kenyon LLP

(57) ABSTRACT

A method for reading out data from a storage medium which stores the data in such a way that they are distributed in sectors, each sector being assigned a sector identifier as a function of the datum respectively stored in the sector. The method includes the following steps: a) assigning a data identifier corresponding to the datum to be read out; b) grouping the data identifiers into at least one group; and c) carrying out a search algorithm in which the sector identifier in each sector is compared by sector and by group to the data identifiers contained in the group, and when one of the data identifiers corresponds to a sector identifier the particular datum is read out from the sector.

12 Claims, 2 Drawing Sheets

METHOD FOR READING OUT DATA FROM A STORAGE MEDIUM

FIELD OF THE INVENTION

The present invention relates to a method for reading out data from a storage medium.

BACKGROUND INFORMATION

Non-volatile control unit data, for example, are stored on hardware memory components such as EEPROM or flash memories. Various data systems, i.e., memory layout strategies, are used for this purpose.

In a typical layout strategy the memory is divided into equal-sized blocks and the actual data are stored in these blocks. In addition to these data, management information is required for each block. The management information for a block may indicate, among other things, whether a block is free or occupied, the length of the data stored in the block, the check sum/cyclic redundancy check (CRC)) for the data, and so forth.

Such a block-oriented EEPROM file system is used in some control units. This type of layout strategy is also present in the file allocation table (FAT) file system for hard disks. Thus, the use of block-oriented file systems is not limited to EEPROM memories.

In a further layout strategy, the memory is divided into two segments, one segment being the active segment. New data are added in each case to the previously written data in the active segment. As soon as the active segment is full, the current data are saved in the passive segment. At that point the active and passive segments exchange roles, and the filled segment—which is then passive—may be erased. The latter segment is thus once again available for storage as soon as the segment—which is then active—is full. Such a system, which may also contain more than two segments, may prospectively be used in control units having flash memories.

A particular characteristic of such file systems is that there is no fixed association of a sector of the storage medium to the data stored at that location. Different data may be stored in the same sector on the storage medium at different times. Thus, to read a concrete datum from the storage medium, a mechanism is necessary in order to find the datum on the storage medium, i.e., to identify the sectors in which the datum is present at the given point in time.

For hard disks, so-called directories are typically used as a mechanism for finding data. These directories contain an association of an identifier for the datum, typically a file name, with a list of the blocks in which the datum is located.

In contrast, another mechanism in which each block contains information as to whether the block is free, or optionally, the identifier for the datum stored in the block (a number) is used in some control units having EEPROM memories. There are also data which are too large to store in a single block. Such data are divided over multiple blocks, the affected blocks being joined to form a sequence, i.e., a linked list. Therefore, a block also contains information as to whether the block is the first in the sequence, and optionally, which block is next in the sequence.

The conventional search for a concrete datum in the block-oriented file system is conducted as follows. All blocks in the storage medium are searched in a given sequence, for example from the first to the last block, until a block is found which meets the following criteria: The block is occupied and is the first block in the sequence, and the identifier for the datum present in the block corresponds to the identifier for the searched datum.

This results in two possibilities: a) If such a block is found, the searched datum may be read. All other blocks relevant to the datum are found via the linkage of blocks, from the predecessor to the successor. b) If no such block is found, the searched datum is not present on the storage medium.

One problem with this conventional method is the potentially long time required for reading multiple data. If each datum is individually requested, the search must be conducted each time over all the blocks in the storage medium. If, for example, the distribution of the data over the storage medium is assumed to be random, it is expected that $(b+1)/2$ blocks must be searched until the sought datum is found in the search for a datum on a block-oriented file system containing b blocks. For d data to be searched for, this results in a number of $d*(b+1)/2$ blocks to be searched. On a worst-case basis, however, it is not possible for this number to be higher.

A problem with this number of blocks to be searched, and the associated computing time, is the fact that for control units most of the data in the system must typically be read in the startup phase. However, the computing time available for this startup phase is usually very short.

SUMMARY

An object of the present invention is to read out data from a storage medium more quickly.

This object may be achieved using an example method for reading out data from a storage medium which stores the data in such a way that they are distributed in sectors, each sector being assigned a sector identifier as a function of the datum respectively stored in the sector, the method including the following steps: a) assigning a data identifier corresponding to each datum to be read out; b) grouping the data identifiers into at least one group; and c) carrying out a search algorithm in which the sector identifier in each sector is compared by sector and by group to the data identifiers contained in the group, and when one of the data identifiers corresponds to a sector identifier, the respective datum is read out from the sector.

One aspect of the present invention is that the reading of multiple data may be accelerated by the fact that each datum is not individually requested, but instead, during the search of the storage medium, groups of data to be read are also searched. Stated more precisely, instead of, for example, searching the storage medium consecutively for data A, B, C, and D, the storage medium is searched only once. Each sector of the storage medium is checked for whether the sector contains one of data A, B, C, or D. If a datum of the searched data is found, it is read, and the search for additional data is then continued. Thus, all data may be read out in a single pass through the storage medium.

There may be situations in which data must be read in multiple steps. For example, it may be necessary for a portion of a system to be available very quickly after system startup, for example for a gateway in the vehicle. In such a case the data for this portion of the system would also be needed very quickly. In such a case, the example method allows the data to be correspondingly grouped. Data A, B, C, and D are divided, for example, into two groups, for example groups (A, B) and (C, D). The example method described above is then carried out once for group A, B, and again for group C, D. Data (A, B) are thus available more quickly. The example method is also advantageous in this example because the storage medium needs to be searched only two times instead of four times.

Thus, the duration of the reading operation as well as the predictability of the time requirements may be significantly improved using the example method according to the present invention.

The example method according to the present invention is particularly advantageous for a storage medium in which the data change their storage location (sector) over time. The method may thus be used in particular for a storage medium which contains no directories having cross references to the storage location of the individual data. The method may be used for a block-oriented storage medium as well as for a non-block-oriented storage medium. The sectors may be memory sectors within the storage medium having a uniform fixed data size (blocks), or may also be memory sectors within the storage medium having a variable data size. Optionally, a lookup table may be provided in a RAM which contains cross references to the data storage location. A search of the storage medium is thereby avoided, but this advantage requires an additional memory sector.

Search algorithm step c) preferably includes the following steps: c1) setting a sector counter to m and a group counter to i; c2) comparing the sector identifier in sector Bem to the data identifiers contained in group Gi; c3) reading out the datum from sector Bem when one of the data identifiers corresponds to a sector identifier; c4) changing sector counter m to a new value and repeating steps c2) through c3) if the last sector is not reached, or continuing to step c5) if the last sector is reached; and c5) changing group counter i to a new value and repeating steps c2) through c4) until the last group is reached.

The example method offers numerous advantages. For a block-oriented file system the following applies, as an example: d is the number of data to be read, g is the number of groups, and b is the number of blocks on the storage medium.

A first advantage is that the average number of blocks to be searched is smaller. Instead of searching an average of $d*(b+1)/2$ blocks as in the related art, only $g*b$ blocks are searched in the provided method, g typically being equal to 1 or at least much smaller than d. This results in a shorter period for reading data.

A further advantage is that there is no variation in the number of blocks to be searched. In the related art the maximum number of blocks to be searched is equal to $d*b$ when no datum is found on the storage medium.

The minimum number of blocks to be searched is computed from $1+2+3+\ldots+d$, and therefore may be derived from the equation $(1+d)*d/2$ when the first d blocks are the blocks being searched.

In contrast, in the example method according to the present invention exactly $g*b$ blocks are searched. As a result, the period for reading the data is constant and the processing time is known. This results in better predictability of the system response regarding run time.

For a control unit the following characteristic values are used, for example:
Number of data to be read: $d=15$,
Number of groups: $g=1$, and
Number of blocks on the storage medium: $b=50$.

Thus, conventionally, at best $(1+d)*d/2=120$ blocks are to be searched. An average number of $d*(b/2)=375$ blocks are to be searched. In the worst case, $d*b=750$ blocks are to be searched.

In contrast, when the example method according to the present invention is used, in each case exactly only $g*b=50$ blocks are to be searched.

In one advantageous embodiment the search algorithm is successively carried out from the first sector to the last sector.

There may also be an advantage for other file systems. An advantage is realized when there is no fixed association of sectors of the storage medium to the data to be searched, and a search is required for reading a given individual datum. Thus, for multiple individual data that are read, the storage medium would have to be searched multiple times. In such cases the duration of the reading operation as well as the predictability of the time requirement may be improved using the method described herein.

Examples of configurations of a non-block-oriented file system in which data are stored in sectors are described below. However, it is also possible for the data to be stored in blocks. The content of a storage medium is represented in the following notation:

[--, A1, B1, --, B2].

The present example describes a storage medium containing five sectors, of which the first and the fourth sector are empty ("--"). There are two data A and B. Datum A is to be stored in a single sector, identified by reference character A1. In contrast, datum B is so large that the content must be stored in two sectors. Reference character B1 denotes the sector containing the first portion of datum B, and reference character B2 denotes the sector containing the second portion of datum B.

In addition, in the following examples it is assumed that, as mentioned above, the sectors are always searched from the first to the last sector. However, this is not a mandatory characteristic of the method; any other sequence is equivalent as long as it results in a full search of the sectors.

In a first example the content of the storage medium is as follows:

[--, B1, A1, --, B2].

It is also assumed that data A, B, and C may be read together.

When the example method is used, sector 1 is searched first and recognized as empty. Next, sector 2 is searched. At this location it is recognized that sector 2 contains the first portion of datum B. Since datum B is to be read, the data from sector 2 (B1) and sector 5 (B2) are read by following a link from sector 2 to sector 5. The search is then continued past sector 2. At sector 3 it is determined that this sector contains datum A, and accordingly datum A is read. The operation continues in sector 4. Since this sector is empty, sector 5 is searched last. Although this sector contains a portion of datum B, no further reading operation is performed since it is not the first sector containing B data. Because all sectors have been evaluated, the search is ended at this point.

This example may be summarized as follows:
Datum B is read first from the storage medium,
Datum A is read second, and
Datum C is not found.

In a further advantageous embodiment, if a datum extends over more than one sector, after finding a first portion of the datum the search algorithm conducts a follow-up search for at least one additional portion of the datum in another sector which is cross referenced by a linking identifier.

This embodiment provides a quicker readout method due to the fact that a link is followed from one sector to an additional linked sector.

In a second example the content of the storage medium is as follows:

[--, A1, B1, --, B].

In this example as well, data A, B, and C are intended to be read together. In contrast to the first example, in the present case datum A is read first.

This example may be summarized as follows:
Datum A is read first from the storage medium, Datum B is read second, and
Datum C is not found.

A comparison of the first and second examples indicates a special feature of the method. Namely, a different reading sequence results solely due to the configuration of the data on the storage medium, regardless of the content of data A and B. If the configuration of the data on the storage medium is able to change, as is customary for non-block-oriented file systems, the reading sequence thus changes as well. This fact must correspondingly be taken into account for a system in which the method according to the present invention is used.

In one preferred specific embodiment of the present invention, the data identifiers are grouped into at least one group in such a way that a predetermined readout sequence is mandated.

As a result of this embodiment, in particular more rapid access and preferential readout are enabled for data having higher priority, i.e., data in groups which are read first. This is achieved by a relative slowing down of access to the remaining data.

A third example shows the manner in which given sequences may be mandated by a specific grouping.

The content of the storage medium is as follows:

[C1, A1, B1, --, B2].

In this case data A, B, and C are to be read once again, but from a system viewpoint it is necessary for datum B to be read before datum A, while there are no limitations for datum C.

This objective is achieved by dividing data A and B into different groups, and reading the group containing datum B first. It is not important whether datum C is assigned to the group for datum A or to the group for datum B. It is assumed that datum C is assigned to the group for datum B.

First the data of group (B, C) are read. Datum C is found and read first, since datum C belongs to group (B, C). As soon as the search reaches sector 2, datum A is found at that location. Since datum A does not belong to group (B, C) of data to be searched, datum A is skipped over and the search continues with sector 3. Datum B is then read because it belongs to group (B, C). Sector 4 is empty and is skipped over; sector 5 does not contain a starting sector. The reading operation for group (B, C) is therefore terminated.

In the second step the data of group (A) are read. Datum C is skipped over because it does not belong to group (A); datum A belongs to group (A) and is read, and lastly datum B is skipped over because it does not belong to group (A).

This example may be summarized as follows:
Datum B is read first from the storage medium,
Datum C is read second, and
Datum A is read third, i.e., after datum B, as requested.

In one preferred specific embodiment, the grouping is carried out in such a way that data identifiers for data having a consecutive readout sequence priority are grouped in a subsequent group which is different.

A necessary reading sequence among data may be mandated as a result of the division into groups, as demonstrated in the third example. Furthermore, individual data may be prevented from being read at all. In this case the corresponding datum is not assigned to any of the groups. A typical scenario in control units is represented by production information, for example serial number and production date. These data are not necessary for operation of the unit, and therefore do not have to be read from the storage medium.

In addition, the number of data records which are read in one pass may be limited. This is necessary when the reading of all data in one step results in timing problems, for example because a watchdog must be operated in intermediate time periods. The solution may be to divide the data into groups in such a way that the reading of the data in any individual group no longer represents a timing problem.

In one preferred specific embodiment of the present invention, a record is kept of which data have already been read out, and a record identifier in response to these data is stored in a record field.

In a further specific embodiment, reading out of one duplicate datum which is present at least twice is prevented in response to the record identifier.

This embodiment allows the readout time for the data to be shortened.

In a further example the content of the storage medium is as follows:

[A1, B1, --, B2, A1].

This specific embodiment takes into account the particular feature that datum A is a duplicate (A1 and A1'). This configuration is possible when given data are stored multiple times to reduce the probability of loss of the datum (for example, due to corruption as the result of electromagnetic irradiation or aging, or defects in the storage medium).

Another scenario which may result in such a configuration is one in which datum A has been updated during a storage operation but the older version has not been properly removed, for example because a power interruption occurred at that moment. In this example, datum A and datum B are to be read out as one group.

First, an instance of datum A is found in sector 1 and read. The start of datum B is then found in sector 2, and datum B is accordingly read. Sector 3 is empty and is skipped over, and sector 4 is likewise skipped over because it is not a starting sector. Lastly, a second instance of item A is found for sector 5. At this point the method has two possible responses. Either datum A is read a second time, or the second instance is ignored.

A variant in which data are read more than once is known within the system context. The recipients of the data should be prepared for the situation in which they receive the same datum multiple times. One disadvantage of this variant is that the duration of the reading operation may change as a function of the content of the storage medium. On the other hand, one advantage of this variant is that provision of a history is not necessary. Since it is not necessary to prevent the same datum from being read multiple times, there is no need to record the particular data which have already been read.

More complex rules in which multiple reading is to be prevented only for specific data are also possible.

In a further embodiment the search algorithm is terminated when all data to be read out have been read.

In this embodiment, due to the possibility of recording in a history the particular data which have already been read, a further variant of the method is used in which the search is terminated as soon as it is known that all data to be searched for have been found. It is then no longer necessary to search the remaining sectors, thereby reducing the time required for reading out the data.

In one preferred embodiment the method is carried out in a non-volatile storage medium, in particular in an EEPROM or a flash memory.

The example method may also be used in body computers having an EEPROM or flash memory for storing non-volatile data. Furthermore, the example method may be used for a flash file system.

The object stated at the outset may also be achieved using a storage medium which stores data to be read out in such a way that they are distributed in sectors, each sector being assigned a sector identifier as a function of the particular datum stored in the sector, the storage medium containing the following: an assignment component which is appropriate for assigning a data identifier corresponding to each datum to be read out; a grouping component which is appropriate for grouping the data identifiers into at least one group; a search algorithm component which is appropriate for comparing the sector identifier in the particular sector, by sector and by group, to the data identifiers contained in the group, and for reading out the particular datum from the sector when one of the data identifiers corresponds to a sector identifier.

An aspect of the storage medium according to the present invention is that the advantages previously described in conjunction with the method are realized. The storage medium according to the present invention is particularly advantageous for a storage medium in which the data change their storage location, i.e., sector, over time. There is no need for the storage medium to contain directories with cross references to the storage location of the individual data.

BRIEF DESCRIPTION OF THE DRAWINGS

The example method according to the present invention for reading out data from a storage medium is explained in greater detail below with reference to an exemplary embodiment.

DETAILED DESCRIPTION OF EXAMPLE EMBODIMENTS

Figure 1:
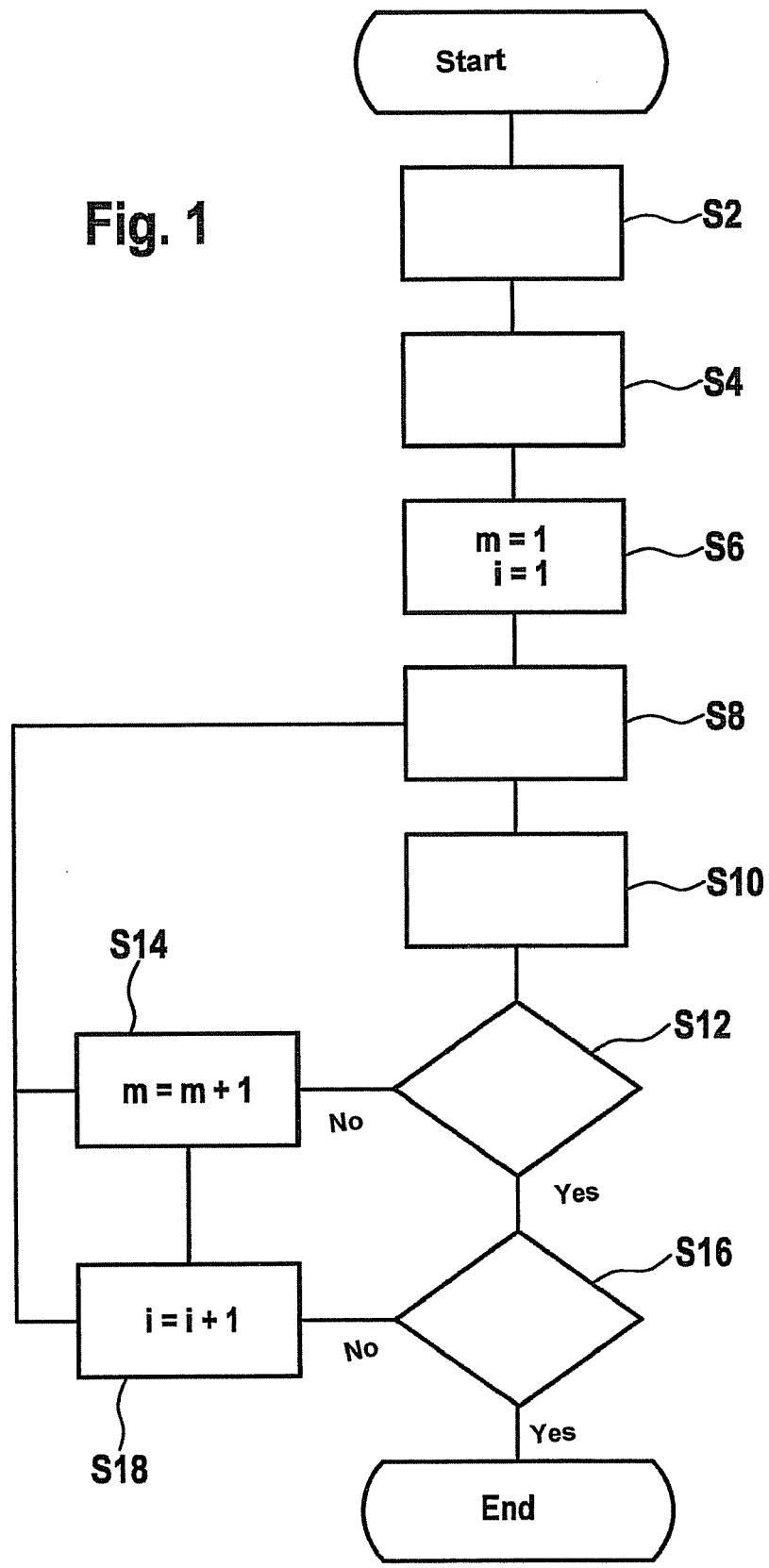
FIG. 1 shows a flow chart for explaining the example method according to the present invention for reading out data from a storage medium.

FIG. 1 shows a flow chart for explaining an example method according to the present invention for reading out data A through D from a storage medium. For this purpose, individual data which require a memory sector that exceeds the capacity of the memory sector of an individual sector may be stored in such a way that they are distributed over multiple sectors.

In a step 52, in each case a data identifier $A_{Dk}$, $B_{Dk}$, $C_{Dk}$, $D_{Dk}$ is assigned to a corresponding datum A, B, C, D to be read out. In a step 54, data identifiers $A_{Dk}$, $B_{Dk}$, $C_{Dk}$, $D_{Dk}$ are grouped into at least one group G1, G2, ... Gi. Beginning with step S6, a search algorithm is carried out. For this purpose a sector counter m and a group counter i are set in step S6. In the present application example the sector counter and the group counter are each set to +1. However, other values are also possible.

In a step S8 the sector identifier in sector Bem is compared to data identifiers $A_{Dk}$, $B_{Dk}$, $C_{Dk}$, $D_{Dk}$ contained in group Gi. In a step 510, datum A, B, C, or D is read out from sector Bem when one of data identifiers $A_{Dk}$, $B_{Dk}$, $C_{Dk}$, or $D_{Dk}$ corresponds to a sector identifier.

In a step S12 a check is performed to determine whether the last sector has been reached. If it is determined in step 512 that the last sector has not been reached, sector counter m is changed to a new value in a step S14. In the present exemplary embodiment the sector counter is incremented by +1; i.e., m=m+1. A branch is then made back to step 58. On the other hand, if it is determined in step S12 that the last sector has been reached, the method continues with step S16.

In step 516 a check is performed to determine whether the last group has been reached. If it is determined in step 516 that the last group has not been reached, group counter i is changed to a new value in a step 518. In the present exemplary embodiment the group counter is incremented by +1; i.e., i=i+1. A branch is then made back to step S8. On the other hand, if it is determined in step 516 that the last group has been reached, the method is terminated.

By using the method provided as an example, data having a high priority are read out from the storage medium much more quickly.

Figure 2:
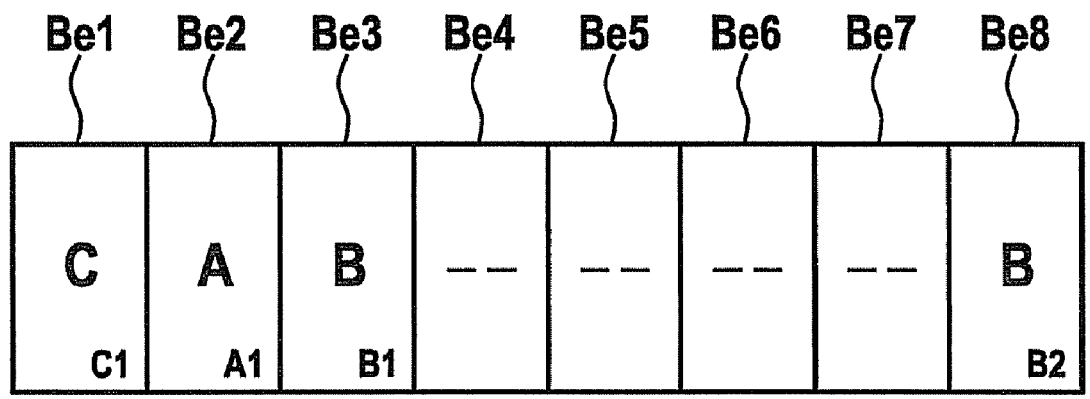
FIG. 2 shows an example of a storage medium containing eight sectors.

FIG. 2 shows a storage medium, for example an EEPROM memory or a flash memory. The storage medium stores data A, B, and C distributed in eight sectors Be1-Be8.

In this example, datum B is so large that it is not possible for it to be stored in a single sector Be1-Be8. This datum is therefore stored in such a way that it is distributed over multiple sectors, the relevant sectors being joined to form a sequence, i.e., a linked list. Each sector Be1-Be8 also contains one sector identifier A1, B1, B2, C1 in response to the particular datum stored in sector Be1-Be8, or an identifier "--" which indicates that the sector is empty. For the storage medium shown in FIG. 2, datum A is stored in sector Be2, indicated by sector identifier A1 in this sector Be2. Datum B is stored in sectors Be3 and Be8, and is indicated in these sectors by sector identifiers B1 and B2. Datum C is stored completely in sector Be1. Sectors Be4 through Be7 do not contain any stored data, as indicated by "--".

Figure 3:
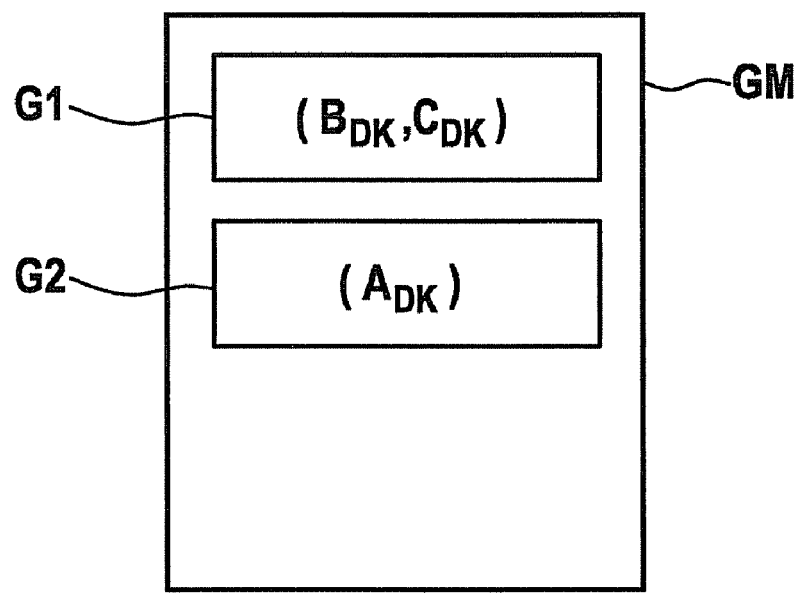
FIG. 3 shows a group matrix containing two groups.

FIG. 3 shows a group matrix GM which contains groups G1 and G2. Data identifiers $A_{Dk}$, $B_{Dk}$, $C_{Dk}$ are grouped in group fields G1 and G2, each data identifier $A_{Dk}$, $B_{Dk}$, $C_{Dk}$ being correspondingly assigned to a datum A through C to be read out from the storage medium shown in FIG. 2.

It is requested, for example, for data A, B, and C to be read, datum B being read before datum A, whereas there are no limitations for datum C.

This request is met by dividing $A_{Dk}$ and $B_{Dk}$ into different groups, and reading the group containing $B_{Dk}$ first. It is not important whether $C_{Dk}$ is assigned to the group for $A_{Dk}$ or to the group for $B_{Dk}$. Assuming that datum $C_{Dk}$ is assigned to the group for $B_{Dk}$, first group G1 contains data identifiers ($B_{Dk}$, $C_{Dk}$), and second group G2 contains data identifier ($A_{Dk}$).

Using groups G1 and G2 placed into groups, a search algorithm is carried out on sectors Be1-Be8 of the storage medium shown in FIG. 2. The search algorithm compares the sector identifiers in each particular sector, by sector and by group, to the data identifiers contained in the group. When one of the data identifiers corresponds to a sector identifier, the particular data is read out from the sector.

To this end, first the data concerning group G1 ($B_{Dk}$, $C_{Dk}$) are read. Datum C is first found and read, since data identifier C1 (see FIG. 2) corresponds to group ($B_{Dk}$, $C_{Dk}$) (see FIG. 3) (i.e., C1=$B_{Dk}$, $C_{Dk}$). As soon as the search reaches sector Be2, datum A is found. Since datum A does not correspond to group ($B_{Dk}$, $C_{Dk}$) of the data to be searched for (i.e., A1≠$B_{Dk}$, $C_{Dk}$), datum A is skipped over and the operation continues with sector Be3. Datum B is then read because it corresponds to group ($B_{Dk}$, $C_{Dk}$) (i.e., B1≡$B_{Dk}$, $C_{Dk}$). Sectors Be4-Be7 are empty and are skipped over. Sector Be8 does not contain a starting sector. The reading operation for group ($B_{Dk}$, $C_{Dk}$) is therefore terminated.

In the second step the data corresponding to group ($A_{Dk}$) are read. Datum C is skipped over because it does not correspond to group ($A_{Dk}$); datum A corresponds to group ($A_{Dk}$) and is read, and lastly datum B is skipped over because it does not correspond to group ($A_{Dk}$)

This example method allows datum B to be read from the storage medium first, datum C to be read second, and datum A to be read third, i.e., after datum B, as requested. The data may be read out much more quickly by simultaneously searching the storage medium for groups G1, G2 of data to be read out.

What is claimed is:

1. A method for reading out data from a storage medium which stores the data in such a way that the data are distributed in sectors, each sector being assigned a sector identifier as a function of the particular datum of the data stored in the sector, the method comprising:
   a) assigning a data identifier corresponding to each datum to be read out;
   b) grouping the data identifiers into at least one group; and
   c) carrying out a search algorithm in which the sector identifier in each sector is compared by sector and by group to the data identifiers contained in the group, and when one of the data identifiers corresponds to a sector identifier, reading out the respective datum from the sector.

2. The method as recited in claim 1, wherein the search algorithm step c) includes the following:
   c1) setting a sector counter to m and a group counter to i;
   c2) comparing the sector identifier in the sector to the data identifiers contained in the group;
   c3) reading out the datum from the sector when one of the data identifiers corresponds to a sector identifier;
   c4) changing the sector counter to a new value and repeating steps c2) through c3) if a last sector is not reached, and continuing to step c5) if the last sector is reached; and
   c5) changing the group counter to a new value and repeating steps c2) through c4) until a last group is reached.

3. The method as recited in claim 1, wherein the search algorithm is successively carried out from a first sector to a last sector.

4. The method as recited in claim 1, wherein if a datum extends over more than one sector, after finding a first portion of the datum, the search algorithm conducts a follow-up search for at least one additional portion of the datum in another sector which is cross referenced by a linking identifier.

5. The method as recited in claim 1, further comprising:
   grouping the data identifiers into at least one group so that a predetermined readout sequence is mandated.

6. The method as recited in claim 5, wherein the grouping is carried out so that data identifiers for data having a consecutive readout sequence priority are grouped in a subsequent group which is different.

7. The method as recited in claim 2, further comprising:
   keeping a record of which data have already been read out, and storing a record identifier in response to these data in a record field.

8. The method as recited in claim 7, wherein reading out of a datum which is present at least twice is prevented in response to the record identifier.

9. The method as recited in claim 2, wherein the search algorithm is terminated when all data to be read out have been read out.

10. The method as recited in claim 1, wherein the method is carried out in a non-volatile storage medium.

11. The method as recited in claim 10, wherein the non-volatile storage medium is one of EEPROM or a flash memory.

12. A device for reading out data, comprising:
    a storage medium which stores data to be read out in such a way that the data are distributed in sectors, each sector being assigned a sector identifier as a function of the particular datum of the data stored in the sector;
    an assignment component adapted to assign a data identifier corresponding to each datum of the data to be read out;
    a grouping component adapted to group the data identifiers into at least one group;
    a search algorithm component adapted to compare the sector identifier in a particular sector by sector and by group to the data identifiers contained in the group, and to read out the respective datum from the sector when one of the data identifiers corresponds to a sector identifier.

* * * * *